Aug. 7, 1934.     J. L. MUSGRAVE     1,968,957
MAGNETICALLY OPERATED VALVE
Filed Feb. 18, 1931

INVENTORS
JOSEPH LESLIE MUSGRAVE

Patented Aug. 7, 1934

1,968,957

UNITED STATES PATENT OFFICE 1,968,957

MAGNETICALLY OPERATED VALVE

Joseph Leslie Musgrave, London, England

Application February 18, 1931, Serial No. 516,806
In Great Britain March 7, 1930

2 Claims. (Cl. 137—139)

This invention relates to automatically controlled valves arranged to open and close under predetermined conditions and refers to that class which are operated magnetically, more particularly in conjunction with a thermostat. The object of the invention is to construct a valve of this class so that the part constituting the valve proper, in addition to being magnetically moved on to its seating, can be actuated by mechanical means, such mechanical means also enabling the movement of the valve to be regulated, and the amount of fluid passing through the valve determined.

According to this invention, where the valve proper is formed with a spindle projecting into a recess in the inner end of an electro-magnet, and moved against its seating by the action of said electro-magnet, the port communicating with the inlet and outlet passages, is constructed in a partition formed centrally in the valve casing, so that when said electro-magnet is energized and attracts the spindle, the valve is moved against and closes the port and in order to also operate this valve mechanically we provide a screwed spindle projecting into the valve casing, which spindle when operated either by a hand wheel or a key forces said valve against its seating and so closes the port. This construction of valve and method of operating the valve proper mechanically is equally applicable when the valve spindle instead of projecting into a recess in the electro-magnet, is fixed to an iron core and is moved against and closes the port by the magnetic action of the electro-magnet on said iron core.

Where the valve proper is drawn on to its seating by the magnetic action of an electro-magnet on an iron core, to which iron core the spindle of the valve is secured, the port communicating with the outlet and inlet passages is constructed in the manner previously described, but in order to enable the valve to be operated mechanically or its movement regulated to determine the amount of fluid passing through, the body of the valve is constructed so that provision is made on the cover of the solenoid casing for the reception of a screwed spindle which bears on the upper end of the iron core, and on this screwed end of said spindle a headed extension is provided fitting into a slotted opening in said upper end of the iron core by which said core is lifted when mechanically opening the valve.

In the accompanying drawing:—

Figure 1:
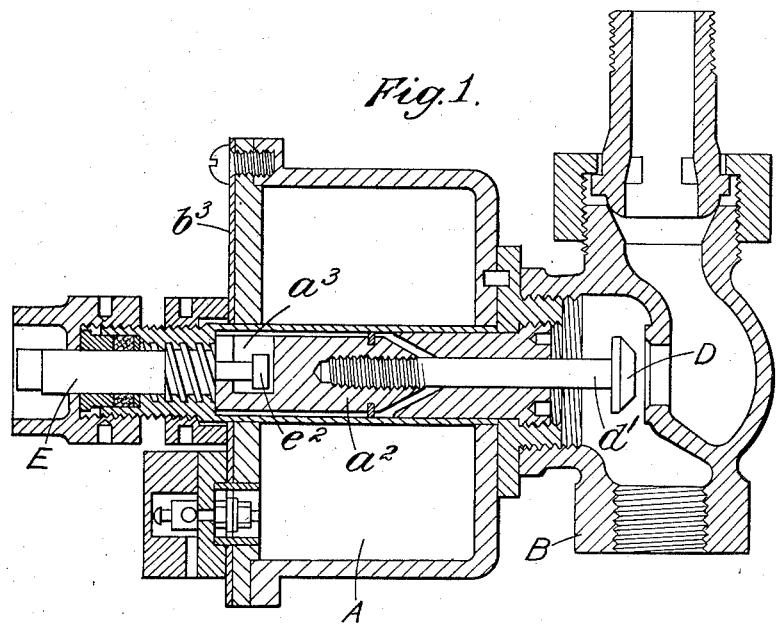
Figure 2:
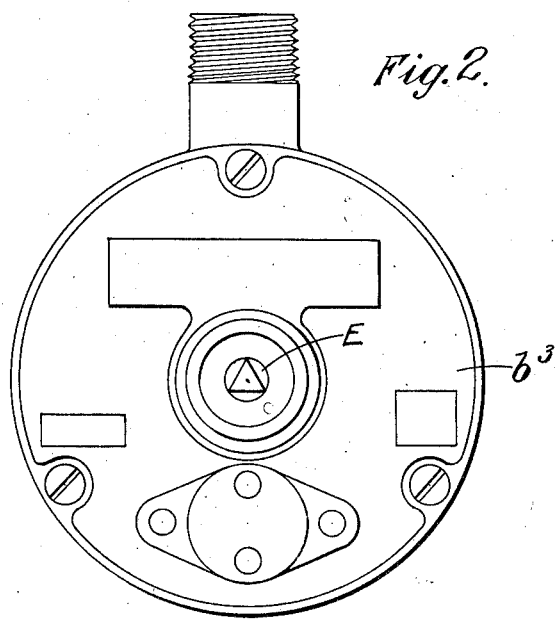

Fig. 1 is a sectional view showing how the valve is operated both electro-magnetically and mechanically when the valve proper is drawn on to its seating by the action of an electro-magnet on an iron core, and Fig. 2 is a front view of Fig. 1.

Referring to the drawing there is shown the magnetically and mechanically operated valve. The character A represents an electro-magnet fixed in one end of a casing B and D indicates the valve proper. The valve proper D is drawn on to its seating by the magnetic action of the electro-magnet A on the iron core $a^2$, to which core the spindle $d^1$ is secured. In this case provision is made on the cover $b^3$ of the electro-magnet A for the screwed spindle E, which spindle E bears upon the upper end of the iron core $a^2$, and provided on this end of said spindle E is a headed extension $e^2$ which fits into a slotted opening $a^3$ formed in said upper end of the iron core $a^2$. It will thus be seen when the spindle E is mechanically operated that the iron core $a^2$ can be lifted by said headed extension $e^2$ and the valve proper D opened, and also that the lift of said valve proper D by the action of the electro-magnet A, can be regulated by the screwed spindle E.

What I claim as my invention and desire to secure by Letters Patent is:—

1. In a valve of the class described comprising a valve casing and a movable valve member, a solenoid core having one end thereof secured to said valve member, a solenoid magnet having a casing secured to the valve casing and surrounding said core, said core having a recess formed in the opposite end thereof, a headed adjusting screw carried by the solenoid casing, the head of said screw being disposed in said recess to permit limited sliding movement of said core to limit the opening and closing movements of said valve member, and said screw serving as independent means for the opening and closing of the valve.

2. In a valve of the class described a valve casing and a movable valve member, a solenoid core having one end thereof secured to said valve member, a solenoid magnet having a casing secured to the valve casing and surrounding said core, said core having a recess formed in the opposite end thereof, an adjusting element carried by the solenoid casing and extended into said recess, said element having means to permit limited sliding movement of said core to limit the opening and closing movements of said valve member, and said element serving as independent means for the opening and closing of the valve.

JOSEPH LESLIE MUSGRAVE.